(12) United States Patent
Itakura (10) Patent No.: US 8,423,353 B2
(45) Date of Patent: Apr. 16, 2013

(54) SHARABLE DISTRIBUTED DICTIONARY FOR APPLICATIONS

(75) Inventor: Ken Itakura, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 12/410,477

(22) Filed: Mar. 25, 2009

(65) Prior Publication Data

US 2010/0250239 A1  Sep. 30, 2010

(51) Int. Cl.
*G06F 17/21* (2006.01)

(52) U.S. Cl.
USPC ............. 704/10; 704/1; 704/2; 704/3; 704/4; 704/5; 704/6; 704/7; 704/8; 704/9; 704/270; 704/272

(58) Field of Classification Search ............ 704/10, 704/270
See application file for complete search history.

(56) References Cited

U.S. PATENT DOCUMENTS

| | | | | |
|---|---|---|---|---|
| 5,224,040 | A * | 6/1993 | Tou | 704/2 |
| 5,418,957 | A | 5/1995 | Narayan | |
| 5,898,157 | A * | 4/1999 | Mangili et al. | 235/380 |
| 6,081,774 | A * | 6/2000 | de Hita et al. | 704/9 |
| 6,222,942 | B1 * | 4/2001 | Martin | 382/232 |
| 6,457,172 | B1 * | 9/2002 | Carmichael et al. | 717/141 |
| 6,886,130 | B1 * | 4/2005 | Unger et al. | 715/207 |
| 7,107,279 | B2 | 9/2006 | Pociu | |
| 7,167,831 | B2 * | 1/2007 | Falcon et al. | 704/275 |
| 7,191,160 | B2 | 3/2007 | Hoeft et al. | |
| 7,197,450 | B2 * | 3/2007 | Shimamura | 704/9 |
| 7,254,774 | B2 * | 8/2007 | Cucerzan et al. | 715/257 |
| 7,284,196 | B2 | 10/2007 | Skeen et al. | |
| 7,409,337 | B1 * | 8/2008 | Potter et al. | 704/9 |
| 7,424,674 | B1 * | 9/2008 | Gross et al. | 715/257 |
| 7,627,177 | B2 * | 12/2009 | Tzadok et al. | 382/182 |
| 7,684,976 | B2 * | 3/2010 | Nakayama | 704/10 |
| 7,747,782 | B2 * | 6/2010 | Hunt et al. | 709/246 |
| 7,801,928 | B2 * | 9/2010 | Rieman et al. | 707/804 |
| 7,822,598 | B2 * | 10/2010 | Carus et al. | 704/9 |
| 7,899,673 | B2 * | 3/2011 | Brown | 704/270 |
| 7,917,355 | B2 * | 3/2011 | Wu et al. | 704/10 |
| 7,945,527 | B2 * | 5/2011 | Michelin | 706/62 |
| 7,949,534 | B2 * | 5/2011 | Davis et al. | 704/270.1 |

(Continued)

OTHER PUBLICATIONS

"Talking SlovoEd Deluxe English Explanatory Dictionary for Pocket PC for HTC Universal Format", retrieved at <<http://htc-universal.handster.com/software.php?id=55&for=HTC%20Universal%20format>>, Jan. 29, 2009.

(Continued)

*Primary Examiner* — Pierre-Louis Desir
*Assistant Examiner* — Fariba Sirjani
(74) *Attorney, Agent, or Firm* — Turk IP Law, LLC (57) ABSTRACT

Architecture for providing and processing a dictionary in a universal format such as XML, for example. The dictionary can be authored while in the universal format, designated for use with multiple compatible applications, and compiled on-the-fly using a dictionary compiler. The dictionary can be shared and/or distributed via a web server, e-mail, and other suitable data transmission techniques. Once downloaded to the client application, the dictionary is registered with the requesting client application for use. With this model, the dictionary created by a user for a specific domain and for a specific application can be easily reused by other applications, and shared among the users belonging to the same domain.

20 Claims, 10 Drawing Sheets

U.S. PATENT DOCUMENTS

| | | | |
|---|---|---|---|
| 8,214,353 B2 * | 7/2012 | Inturi et al. | 707/715 |
| 8,347,402 B2 * | 1/2013 | Imrey et al. | 726/27 |
| 2002/0049790 A1 | 4/2002 | Ricker et al. | |
| 2002/0129069 A1 * | 9/2002 | Sun | 707/532 |
| 2003/0093433 A1 * | 5/2003 | Seaman et al. | 707/102 |
| 2003/0233251 A1 * | 12/2003 | Haskell et al. | 705/2 |
| 2004/0205671 A1 * | 10/2004 | Sukehiro et al. | 715/532 |
| 2005/0038644 A1 * | 2/2005 | Napper et al. | 704/9 |
| 2005/0055197 A1 * | 3/2005 | Karavansky | 704/1 |
| 2005/0080797 A1 * | 4/2005 | Short | 707/100 |
| 2005/0149914 A1 | 7/2005 | Krapf et al. | |
| 2005/0198622 A1 * | 9/2005 | Ahluwalia et al. | 717/130 |
| 2006/0143564 A1 * | 6/2006 | Bates et al. | 715/533 |
| 2006/0190497 A1 * | 8/2006 | Inturi et al. | 707/201 |
| 2006/0206313 A1 * | 9/2006 | Xu et al. | 704/10 |
| 2006/0271920 A1 * | 11/2006 | Abouelsaadat | 717/137 |
| 2006/0288208 A1 | 12/2006 | Dashora et al. | |
| 2007/0055933 A1 | 3/2007 | Dejean et al. | |
| 2007/0067471 A1 * | 3/2007 | Wolfe et al. | 709/230 |
| 2007/0265831 A1 * | 11/2007 | Dinur et al. | 704/10 |
| 2007/0265832 A1 * | 11/2007 | Bauman et al. | 704/10 |
| 2008/0033724 A1 * | 2/2008 | Block et al. | 704/257 |
| 2008/0104574 A1 | 5/2008 | Mak et al. | |
| 2008/0154582 A1 * | 6/2008 | Bruecken | 704/10 |
| 2009/0113445 A1 * | 4/2009 | Sakashita et al. | 719/313 |
| 2009/0204392 A1 * | 8/2009 | Ishikawa | 704/9 |
| 2009/0271200 A1 * | 10/2009 | Mishra et al. | 704/254 |
| 2010/0011016 A1 * | 1/2010 | Greene | 707/102 |
| 2010/0023318 A1 * | 1/2010 | Lemoine | 704/9 |
| 2010/0076751 A1 * | 3/2010 | Chikuri | 704/10 |
| 2010/0114887 A1 * | 5/2010 | Conway et al. | 707/737 |
| 2010/0185631 A1 * | 7/2010 | Caldwell et al. | 707/756 |
| 2011/0131037 A1 * | 6/2011 | Huang et al. | 704/10 |
| 2011/0178794 A1 * | 7/2011 | Michelin | 704/9 |
| 2011/0213766 A1 * | 9/2011 | Hong et al. | 707/718 |
| 2011/0295850 A1 * | 12/2011 | Tankovich et al. | 707/727 |

OTHER PUBLICATIONS

"XML Dictionary Exchange Format", retrieved at <<http://xdxf.sourceforge.net/>>, Jan. 29, 2009.

Kamei, Shin-Ichiro, "Sharing Dictionaries among MT Users By Common Formats and Social Filtering Framework", Machine Translation Summit VII, retrieved at <<http://www.mt-archive.info/MTS-1999-Kamei.pdf>>, Sep. 13-17, 1999.

"Spell Checking and Sharing a Dictionary with MS Word", retrieved at <<http://www.cadforum.cz/cadforum_en/qaID.asp?tip=2963>>, Jan. 29, 2009.

Musgrave, Simon, "Archiving and Sharing Language Data Using XML", Sustainable Data from Digital Fieldwork Conference, retrieved at <<http://ses.library.usyd.edu.au/bitstream/2123/1301/1/12FH2006.pdf>>, Dec. 4-6, 2006.

Seiji, et al., "Introduction to UTX, a Specification for a Shared User Dictionary", Proceedings of the 11th annual meeting of Association for Natural Language Processing, retrieved at <<http://www.aamt.info/english/utx/utxs091-paper-e.pdf>>, Mar. 2005.

"International Search Report", Mailed Date: Oct. 25, 2010, Application No. PCT/US2010/028026, Filed Date: Mar. 19, 2010, pp. 8.

* cited by examiner

SHARABLE DISTRIBUTED DICTIONARY FOR APPLICATIONS

BACKGROUND

An electronic dictionary can be an essential component for applications that perform linguistic analysis, such as IME (input method editor), spell checker, hand writing recognizer, speech dictation, and so on. However, as the nature of the natural language and software evolves, it is impossible to include all the necessary words in an application, because application performance can degrade, new words appear after a product release, domain-specific terms can decrease the accuracy for users which do not belong to the domain, and so on.

Common approaches to addressing this problem include providing a domain-specific dictionary as an add-on dictionary, or providing a feature to create a custom dictionary for personal use, for example. A problem with the current add-on dictionary and custom dictionary is the use of propriety formats for specific applications. Thus, these propriety formats are very difficult or impossible to share across other applications, despite that terminologies are common for a user or a user group across applications.

Another problem of the add-on dictionary is the granularity of the dictionary. In the marketplace, dictionaries are available only for large granularity domains, which have large numbers of users, because dictionaries for small domains are difficult to commercialize.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides an electronic dictionary in a universal format such as XML, for example. In support thereof, an on-the-fly dictionary compiler is also provided that installs in the user environment, as well as a dictionary authoring tool. With this model, the dictionary created by a user for a specific domain and for a specific application can be easily reused by other applications, and shared among the users belonging to the same domain. Moreover, the dictionary file can be distributed by storing the dictionary file on a web server, attached in an e-mail, and so on.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture provides and processes a dictionary in a universal format such as XML (extensible markup language), for example. The dictionary can be authored while in the universal format, designated for use with multiple compatible applications, and compiled on-the-fly using a dictionary compiler. The dictionary can be shared and/or distributed via a web server, e-mail, and other suitable data transmission techniques. Once downloaded to the client application, the dictionary is registered with the requesting client application for use. With this model, the dictionary created by a user for a specific domain and for a specific application can be easily reused by other applications, and shared among the users belonging to the same domain.

It is to be appreciated that the client system does not need to compile the dictionary, but can use the dictionary when in the universal format. Additionally, the transfer method can be any method that is used to transfer a computer file. Note also that it is not necessary to transfer the file to another machine. The dictionary can be sharable in an environment across applications.

Moreover, the disclosed architecture can also be employed for text searching, word breaking (the decomposition of text into words), text mining (deriving high-quality information from text), text-to-speech processing, machine translation (conversion of text or speech from one language to another language), and dictionaries for human reading.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
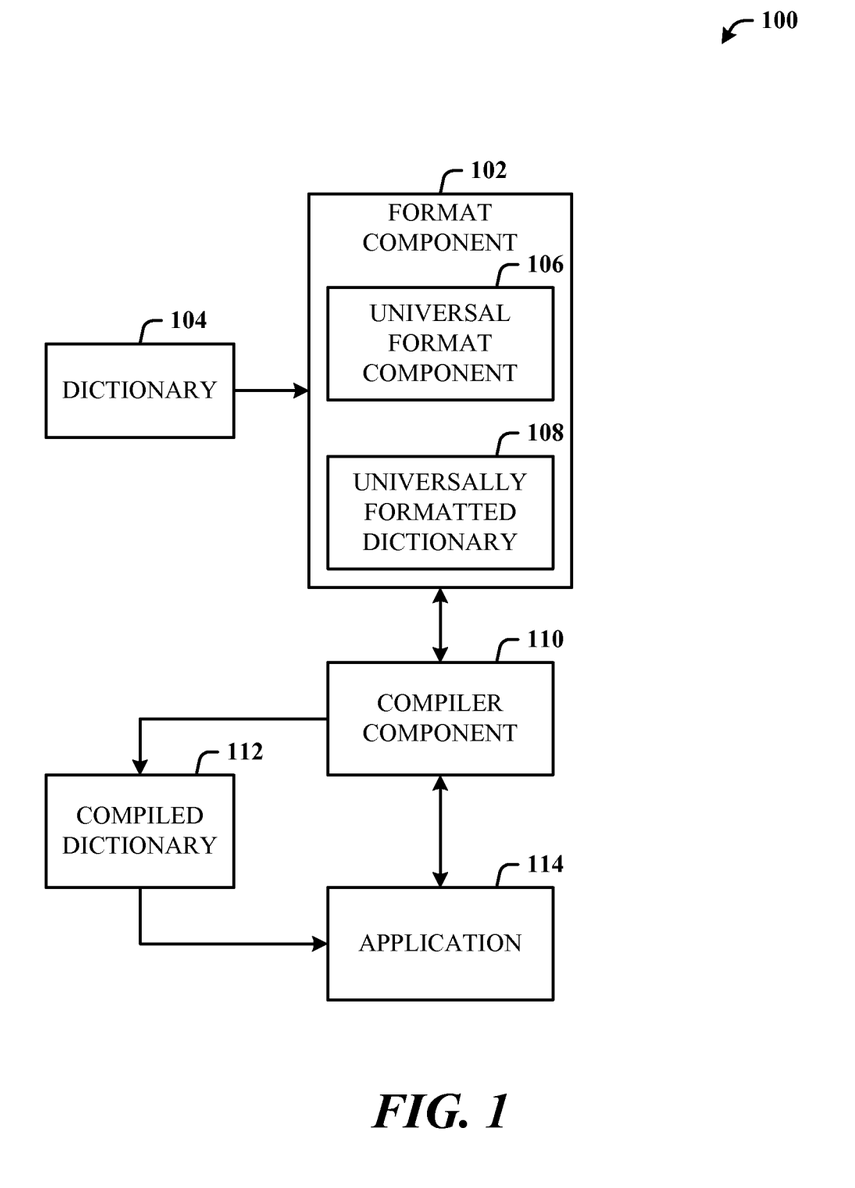
FIG. 1 illustrates a computer-implemented dictionary system in accordance with the disclosed architecture.

FIG. 1 illustrates a computer-implemented dictionary system 100 in accordance with the disclosed architecture. The system 100 includes a format component 102 for formatting a dictionary 104 (e.g., electronic) in a universal format facilitated by the universal format component 106, the universally formatted dictionary 108 consumable by disparate applications. The system 100 also includes a compiler component 110 for compiling the formatted dictionary 108 into a compiled dictionary 112 for use in an application 114 in response to the dictionary 104 being accessed. The universal format can be XML, for example.

The dictionary 104 can be centrally located (e.g., a server) for access by the disparate applications. The compiler component 110 facilitates suitable compiling of the dictionary 104 for the multiple different applications. In other words, the compiler component 110 represents multiple different compilers for different compiling uses. For example, the compiler component 110 includes a compiler for compiling the formatted dictionary 108 for use by a linguistic analysis application. The compiler component 110 also includes a compiler for compiling the formatted dictionary 108 for use by a spell checking application. Still further, the compiler component 110 includes a compiler for compiling the formatted dictionary 108 for use by a speech dictation system. Other compilers can be included as part of the compiler component 110.

The formatted and compiled dictionary 112 can be downloaded and registered with the application 114 for use with the application 114. The compiled and formatted dictionary 112 can also be shared via at least one of a website, an electronic message, or a file sharing application, for example. It is to be understood, however, that the application 114 can utilize the formatted dictionary 108 directly (in the universal format) rather than the compiled form (the compiled dictionary 112).

Figure 2:
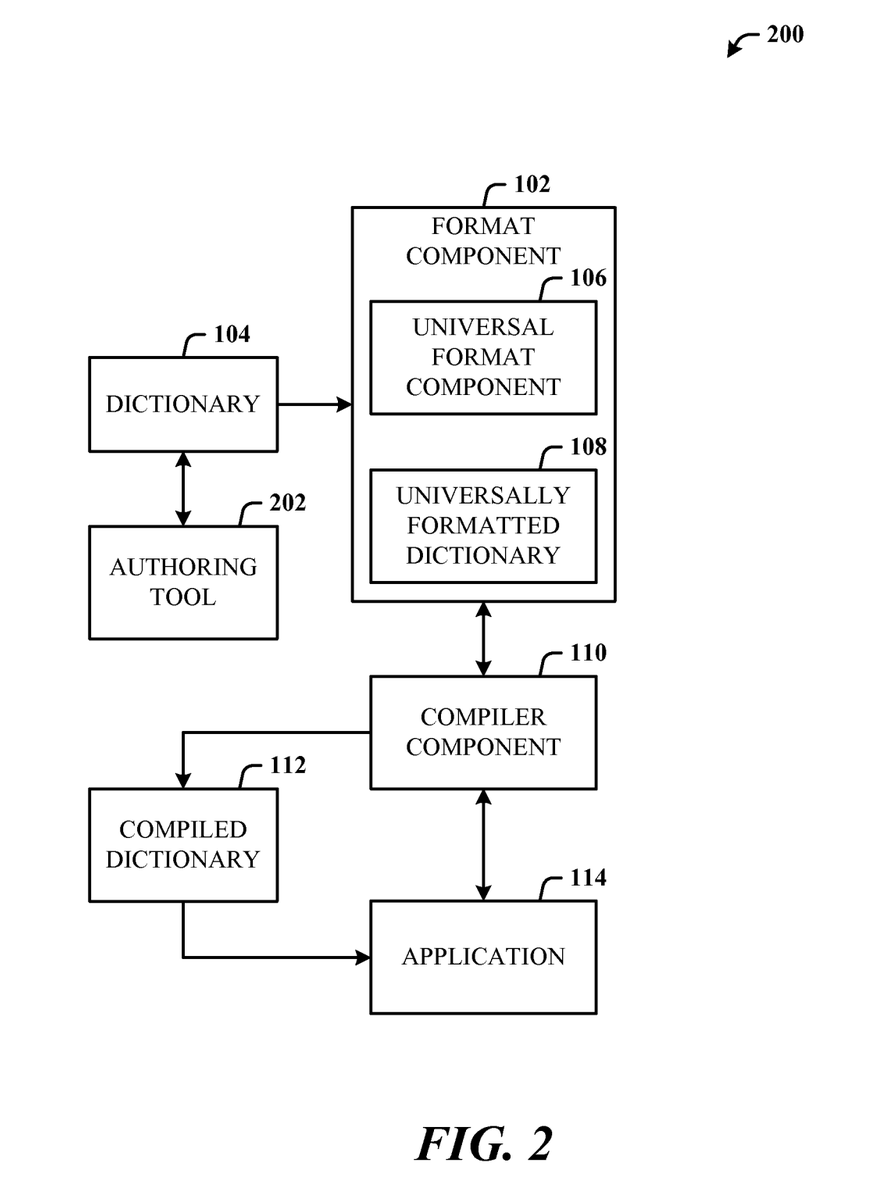
FIG. 2 illustrates a system that is an alternative embodiment of the system of FIG. 1 that further employs an authoring tool.

FIG. 2 illustrates a system 200 that is an alternative embodiment of the system 100 of FIG. 1 that further employs an authoring tool 202. The system 200 includes the format component 102 for formatting the dictionary 104 in the universal format facilitated by the universal format component 106. The formatted dictionary 108 can be consumable by disparate applications. These can be client applications and/or server applications. The system 200 also includes the compiler component 110 for compiling the formatted dictionary 108 into the compiled dictionary 112 for use in or with the application 114 (or other compatible applications) in response to the dictionary 104 being accessed (or requested).

The authoring tool 202 is employed for authoring the formatted dictionary 108 to include at least one of text data, linguistic data, handwriting data, or dictation data, for example. A dictionary author creates the universally formatted dictionary 108 (e.g., an XML format) using the authoring tool 202, or converts the dictionary source using a script or other suitable program.

A dictionary that is created for a specific application may not have the attributes that designate use for other applications. Thus, if the author wants to use the dictionary for the other applications, those missing attributes can be added. The distributed dictionary can be used by other clients that support the dictionary. The support by the application 114 includes an appropriate loader for the dictionary.

Additionally, an application (the application 114) that uses the dictionary (the dictionary 104) has an associated dictionary compiler (the compiler 110). Typically, the compiler 110 is in the production environment, but not in the user environment. The basic mechanism for compiling the dictionary from source text is sufficiently common so that the creation of such a component receives the universally formatted dictionary 108 as input, by reusing the existing dictionary compiler for the application. The receiving or designated application 114 registers the compiled dictionary 112 so that the dictionary can be used by the application 114. Moreover, the same dictionary can be shared among the compatible applications that support the format.

Put another way, the system 200 is a computer-implemented dictionary system comprising the format component 102 for formatting the dictionary 104 in a universal format consumable by disparate applications, the authoring tool 202 for authoring the formatted dictionary 108 to include at least one of textual data, linguistic data, or dictation data, and the compiler component 110 for compiling the formatted dictionary 108 in response to a request for the dictionary 104.

The format component 102, authoring tool 202, and compiler component 110 are centrally located for access by the disparate applications. The compiler component 110 compiles the formatted dictionary 108 for use by at least one of a linguistic analysis application, a spell checking application, or a speech dictation system. The formatted and compiled dictionary 112 can be downloaded and registered with a client application for use with the client application. The formatted and compiled dictionary 112 can be distributed and shared via at least one of a website, an electronic message, or a file sharing application.

Figure 3:
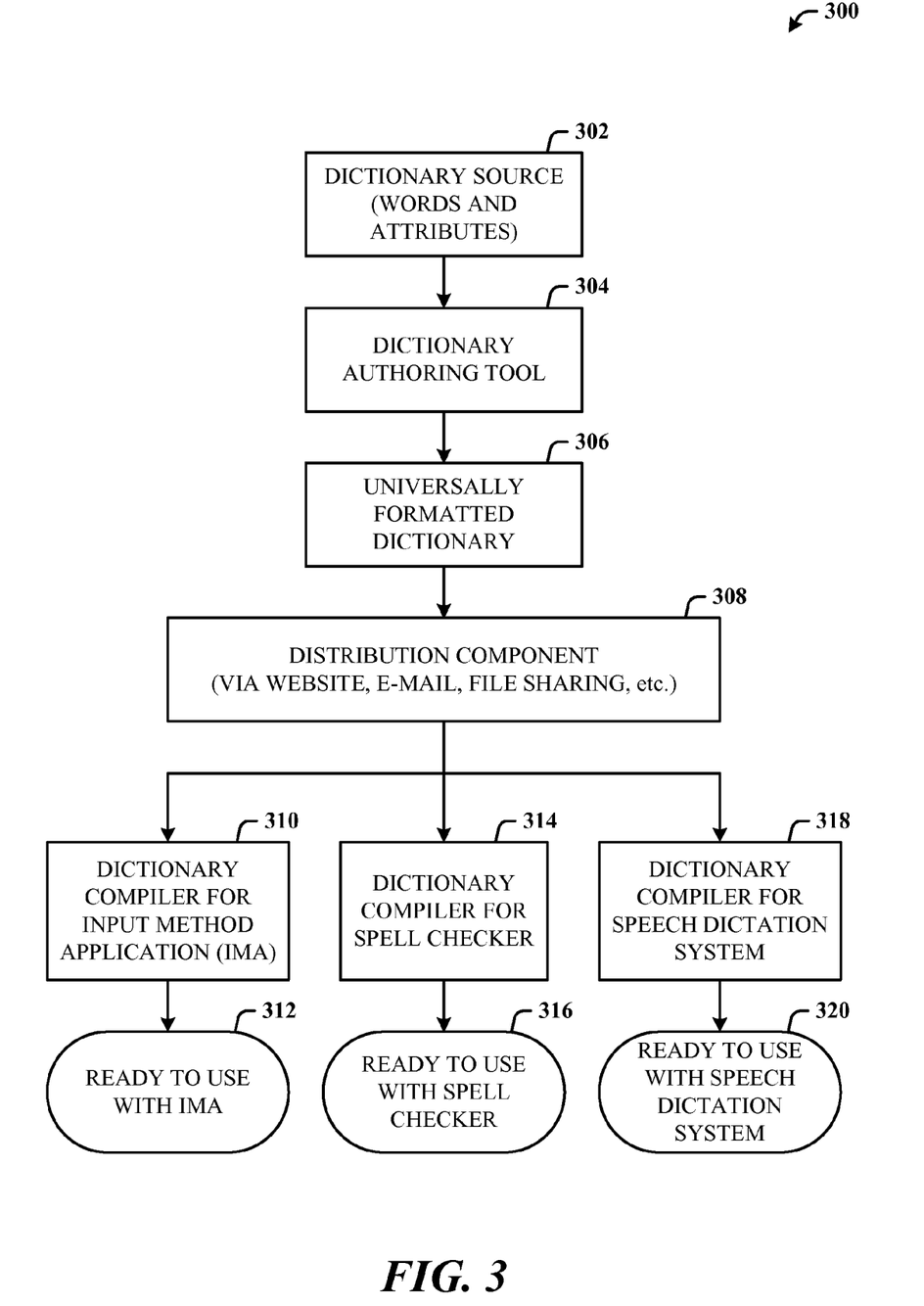
FIG. 3 illustrates a flow diagram for individual dictionary use by disparate applications.

FIG. 3 illustrates a flow diagram 300 for individual dictionary use by disparate applications. At 302, the dictionary source is provided that includes words and attributes. The attributes can designate that the dictionary will be used by one or more end-user applications. At 304, the dictionary authoring tool is employed to make changes to the dictionary source. At 306, the dictionary is formatted using the universal format. At 308, a distribution component facilitates distribution of the formatted dictionary to suitable applications.

For example, in response to a request from an input method application (e.g., IME-input method editor), the distribution component forwards the universally formatted dictionary to a dictionary compiler for the input method application, at 310. At 312, the input method application dictionary is then ready of use with the input method application. Similarly, in response to a request from a spell checking application, the distribution component forwards the universally formatted dictionary to a dictionary compiler for the spell checking application, at 314. At 316, the spell checking dictionary is then ready of use with the spell checking application. Yet again, in response to a request from a speech dictation application, the distribution component forwards the universally formatted dictionary to a dictionary compiler for the speech dictation application, at 318. At 320, the speech dictation dictionary is then ready of use with the speech dictation application.

Figure 4:
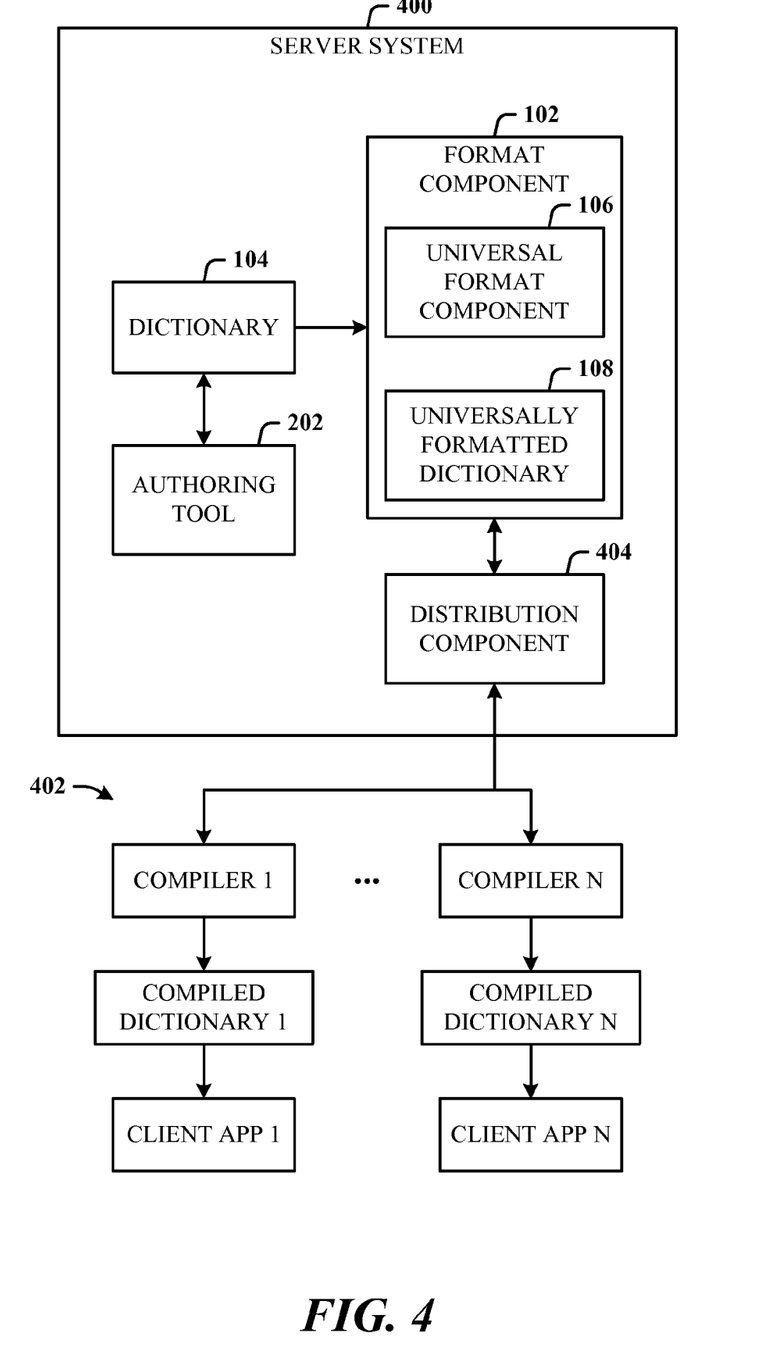
FIG. 4 illustrates a centrally located server system for sharing and distributing dictionaries based on a universal format.

FIG. 4 illustrates a centrally located server system 400 for sharing and distributing dictionaries based on a universal format. The system 400 includes the format component 102 for formatting the dictionary 104 in the universal format, facilitated by the universal format component 106, for distribution and sharing with client systems 402 via a distribution component 404. File synchronization can be performed between multiple servers that store the same dictionary file, for example. This can occur for the multiple different dictionary files that can be created and utilized for the many different client systems 402.

The distribution component 404 transmits the formatted dictionary 108 to one or more of the client system 402 for compiling into the compiled dictionary and for use with or in the client systems 402 in response to the dictionary 104 being accessed (or requested). The system 400 can also include the authoring tool 202 for authoring the formatted dictionary 108 to include the text data, linguistic data, handwriting data, dictation data, and/or other kinds of data, for example. The server system 400 can be a web server for distributing the dictionary via the Internet or enterprise, for example.

For the input method application, the coverage of the lexicons is managed to improve the accuracy and user experience. The input method application dictionary can be configured to cover most frequent words, to address major scenarios well without suffering from the side-effects of low frequency words.

The web dictionary can cover most of the area of the user dictionary and also partially covers the domain dictionary, new-word dictionary, and collaboration dictionary, for example.

The disclosed dictionary architecture can draw content from other available dictionary sources on major networks (e.g., the Internet). For example, lexicons related to Asian languages, automobiles, printing, financials, construction, abbreviations, Japanese English, translation, old words, can be searched and content obtained therefrom. Similarly, dictionary content can be obtained from sources related to Chinese traditional (CHT) and Chinese simplified (CHS), compound words, old poems, legal, economy, medical, and so on.

It is to be appreciated that the compiler can also be utilized as a client application that receives the universally formatted dictionary from the central location, and automatically compiles the dictionary for the local client(s).

A dictionary GUID (globally unique identifier) can be utilized, which is the identifier of the dictionary. When a dictionary is added and the dictionary GUID is matched with one of a list of existing dictionaries, the existing dictionary is replaced with the added dictionary.

The web dictionary XML file can include a specific string that can be recognized by different search crawlers so that user can find the web dictionary, even if the dictionary is not on a web dictionary portal. A web dictionary portal can include a link to the search result page of the search. A web dictionary portal is a simple web page of an online suite application, for example. The portal holds a categorized list of the available web dictionaries.

A content provider can request to add a dictionary. Basic checks related to geopolitics, accuracy, and performance can be conducted to ensure the dictionary meets predefined criterion. A web dictionary can start service without first loading the dictionary on the portal. Additionally, any user can create another web dictionary portal, since the web dictionary is a link list.

A user can update a dictionary by selecting on "update" button of a dictionary property. The update URL can point directly to the dictionary file itself, but also can point to a general webpage, which has a link to the dictionary and can contain an explanation about the dictionary.

Dictionaries can be code signed. For the security reason, a code-signed dictionary cannot be replaced by non-code-signed dictionary even when the dictionary GUID is the same.

A dictionary can include problematic content that impacts performance or conversion accuracy. A user is provided the option to remove the dictionary from the property. However, since it can be difficult to automatically distinguish whether an entry in the dictionary is a problem, the suspicious entries can be blocked. This is a trade-off between benefit and trustworthiness.

Digital signatures for the dictionary files can be provided to ensure that the contents are not altered. Signed and unsigned dictionary sources can be supported. When the dictionary source is signed, the signature is displayed and the user is prompted as to whether or not to use the dictionary. Similarly, when the dictionary source is unsigned, a message can be displayed requesting that the user choose whether or not to use the dictionary.

The digital signature is used avoid tampering. By checking the signature user can determine the quality of the dictionary by the name of signature. For the content provider, the signature can be used to avoid attack, and thus, damage to the reputation of the company by altering the dictionary content.

One example of registration of an input method application dictionary from a website is the following. When a user selects a link on a website to a web dictionary, the browser can display and run a download confirmation dialog. The input method application checks the digital signature and displays an indicator if the dictionary is unsigned or a different indicator if the dictionary is properly signed. The user can choose to continue or not use the unsigned dictionary.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
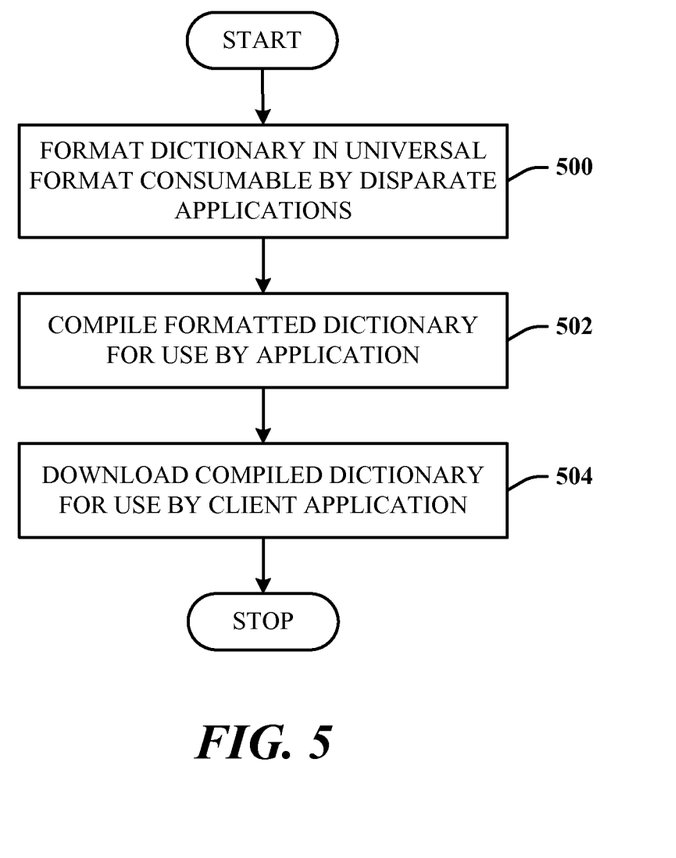
FIG. 5 illustrates a method of processing a dictionary for application use.

FIG. 5 illustrates a method of processing a dictionary for application use. At 500, a dictionary is formatted in a universal format that is consumable by disparate client applications. At 502, the formatted dictionary is compiled for use by an application in response to a request for the dictionary. At 504, the compiled dictionary is downloaded for use by the application.

Figure 6:
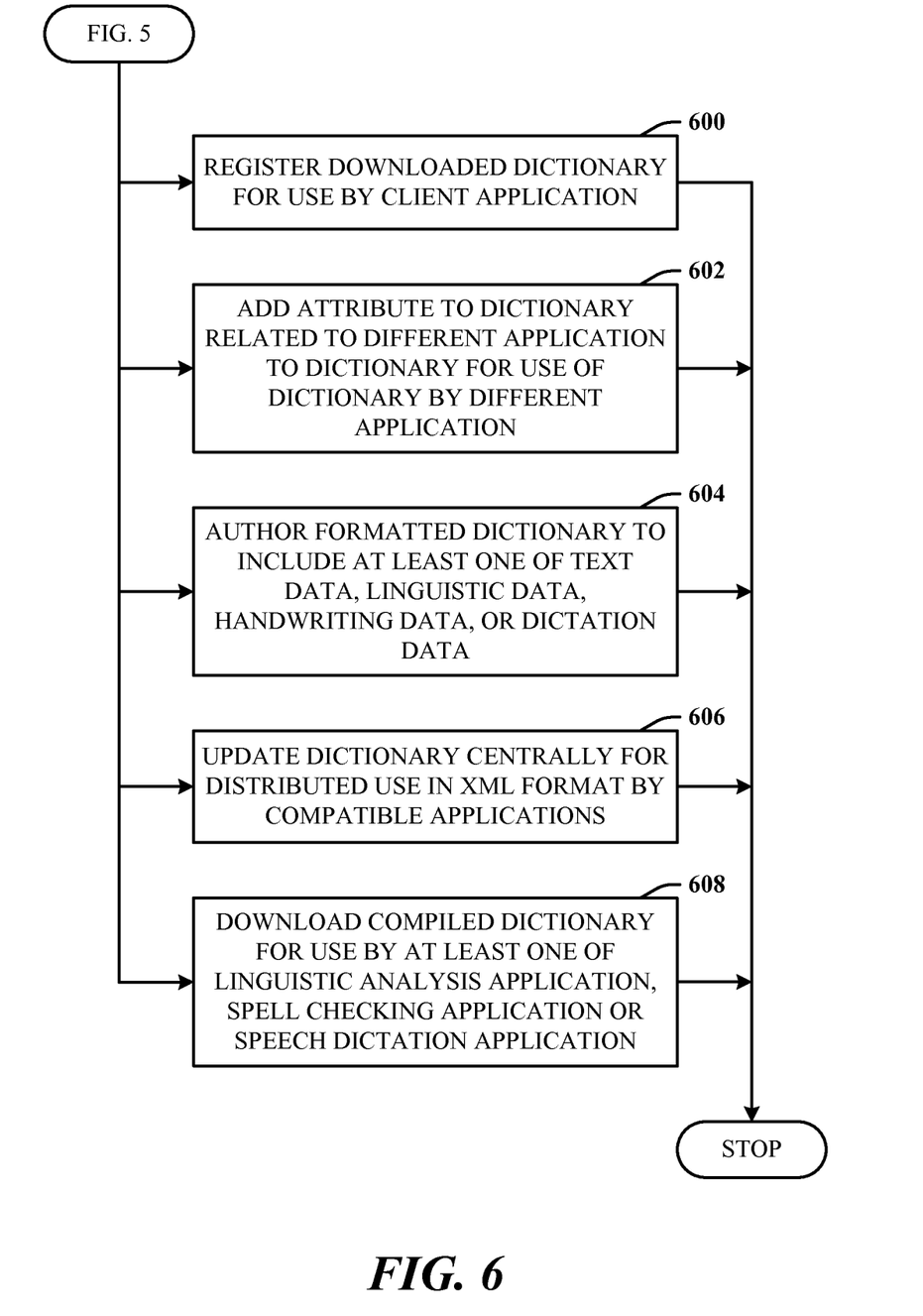
FIG. 6 illustrates additional aspects for method of FIG. 5.

FIG. 6 illustrates additional aspects for method of FIG. 5. At 600, registering the downloaded dictionary for use by the application. At 602, an attribute is added to the dictionary related to a different application to the dictionary for use of the dictionary by the different application. At 604, the formatted dictionary is authored to include at least one of text data, linguistic data, hand writing data, or dictation data. At 606, the dictionary is updated centrally for distributed use in an XML format by compatible applications. At 608, the compiled dictionary is downloaded for use by at least one of a linguistic analysis application, a spell checking application, or a speech dictation application.

Figure 7:
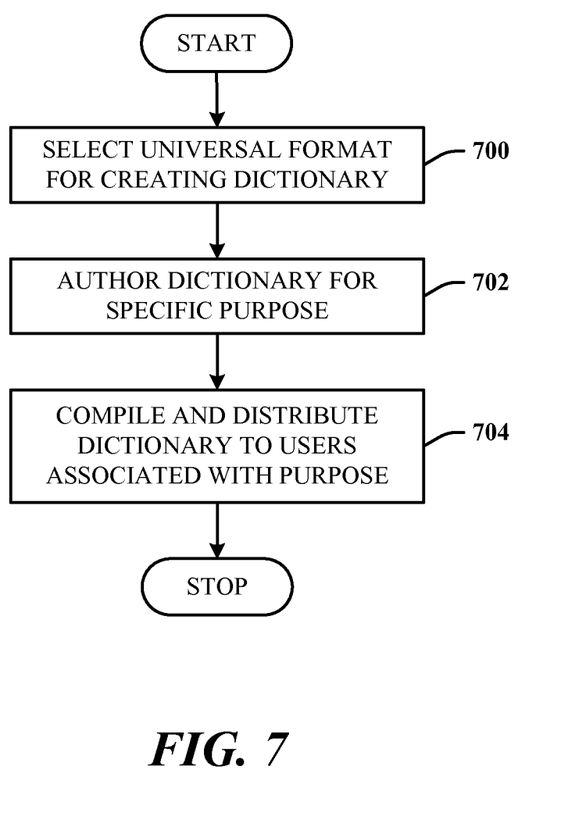
FIG. 7 illustrates a method of processing a dictionary for a specific purpose.

FIG. 7 illustrates a method of processing a dictionary for a specific purpose. For example, the purpose can be linguistic analysis, or dictation. At 700, a universal format is selected for creating the dictionary. At 702, the dictionary is authored for the specific purpose. At 704, the dictionary is compiled and distributed to users associated with the purpose. Distribution can be direct transmission of the compiled dictionary to the users associated with the purpose, posting on a website, and/or distributed storage across multiple servers that can be accesses by the users.

Figure 8:
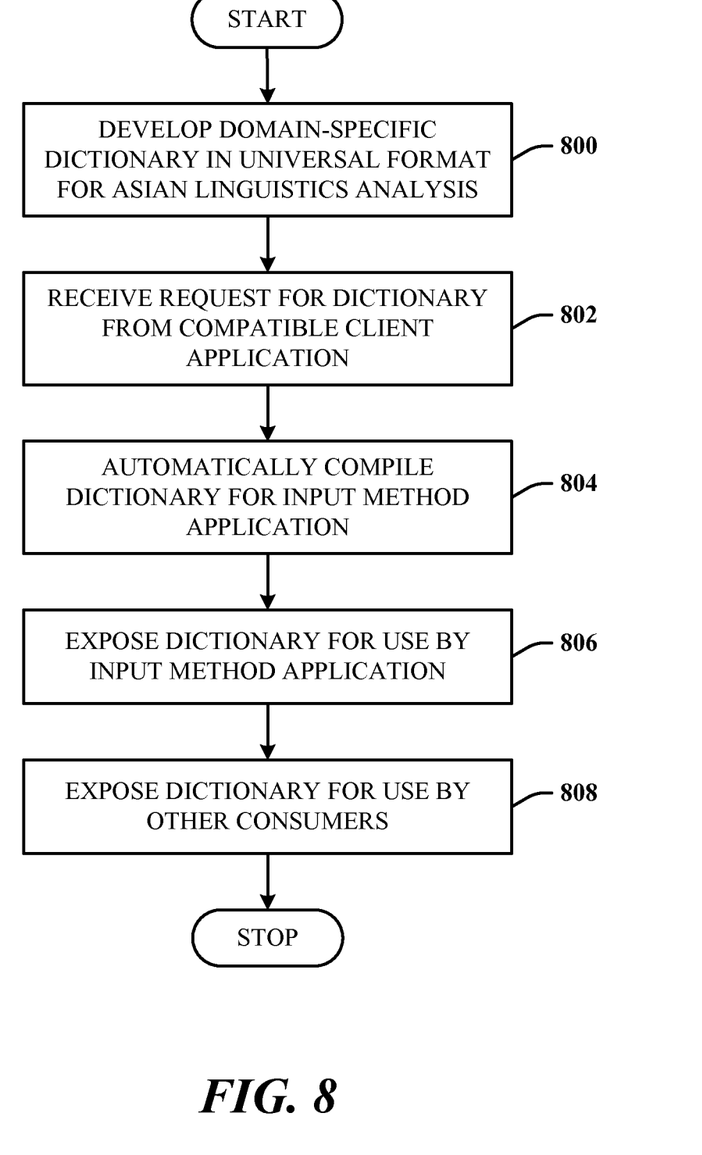
FIG. 8 illustrates a method of providing a domain-specific dictionary.

FIG. 8 illustrates a method of providing a domain-specific dictionary. At 800, the domain-specific dictionary is developed in a universal format (e.g., XML) for Asian linguistics analysis. At 802, a request is received from a compatible client application for the dictionary. At 804, the dictionary is automatically compiled for an input method application (e.g., IME). At 806, the dictionary is exposed for use by the input method application. The exposure can be as an add-in module that is downloaded to the input method application, for example. Alternatively, the exposure can be as an update to an existing component of the input method application. At 808, the dictionary is exposed for use by other consumers. The consumers can be similar input method applications of other users, and/or compatible applications that can interface to the dictionary.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
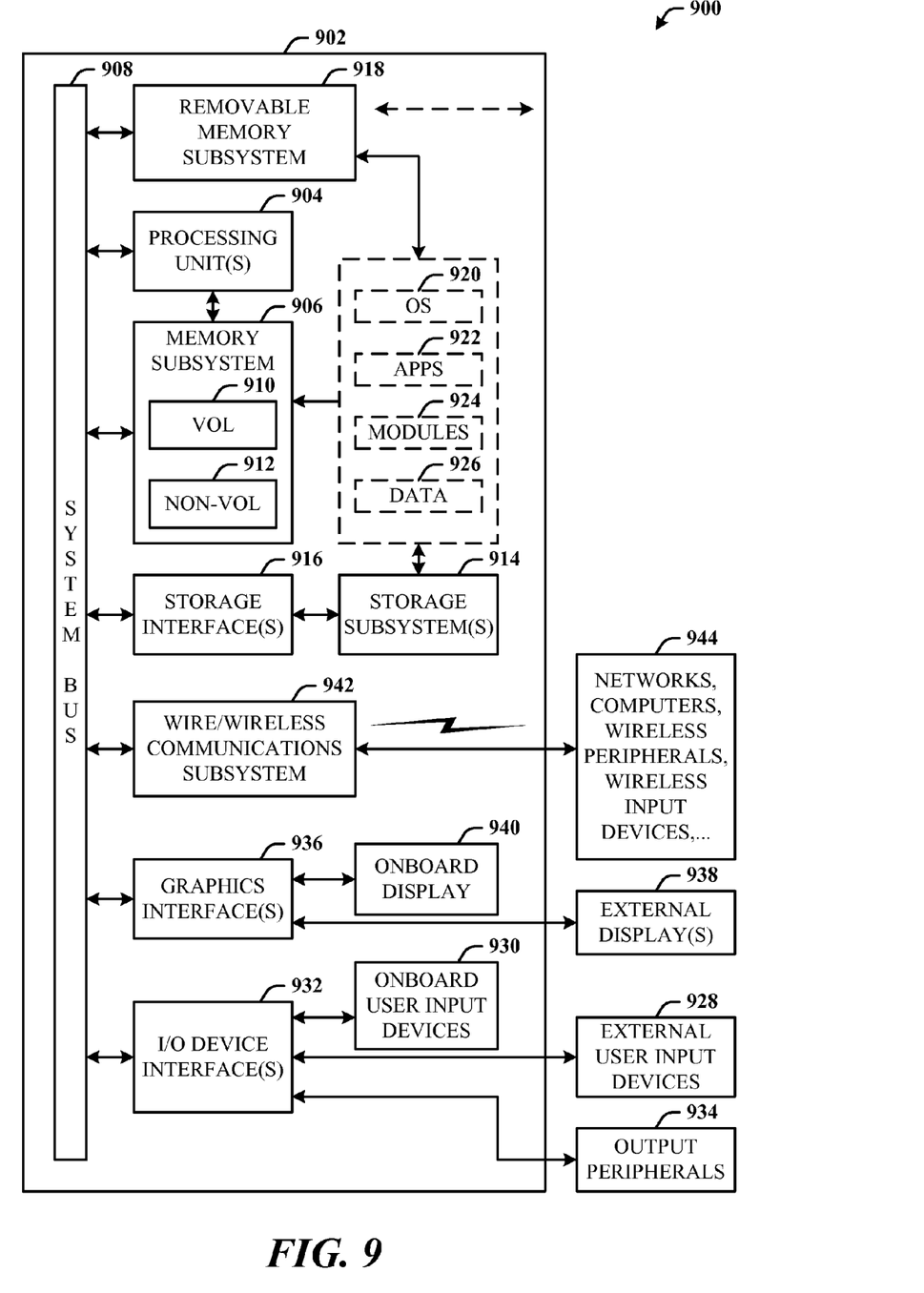
FIG. 9 illustrates a block diagram of a computing system operable to execute dictionary compile and sharing in accordance with the disclosed architecture.

Referring now to FIG. 9, there is illustrated a block diagram of a computing system 900 operable to execute dictionary compile and sharing in accordance with the disclosed architecture. In order to provide additional context for various aspects thereof, FIG. 9 and the following discussion are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

Where the computer 902 is a server machine, one or more application programs 922, other program modules 924, and program data 926 can include the format component 102, the dictionary 104, the universal format component 106, the formatted dictionary 108, and the compiler component 110 of FIG. 1, the authoring tool 202 of FIG. 2, the entities, components, and flow represented by the flow diagram 300 of FIG. 3, the server system 400 and client systems 402 of FIG. 4, and the methods represented by the flow charts of FIGS. 5-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile media, removable and non-removable media. For the computer 902, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP) using logical connections via a wired/wireless communications subsystem 942 to one or more networks and/or other computers. The other computers can include workstations, servers, routers, personal computers, microprocessor-based entertainment appliance, a peer device or other common network node, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or has other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
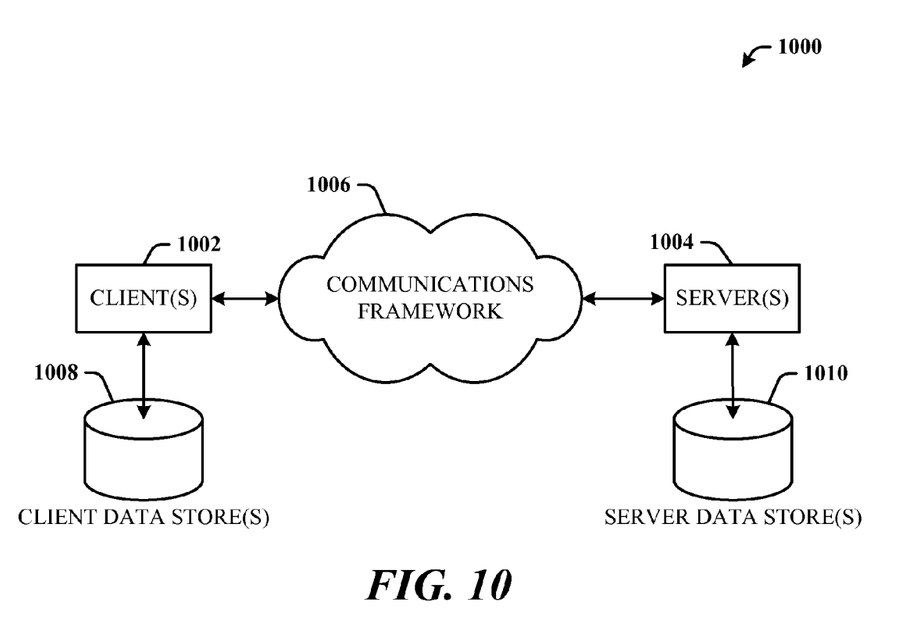
FIG. 10 illustrates a schematic block diagram of a computing environment for distributing dictionaries.

Referring now to FIG. 10, there is illustrated a schematic block diagram of a computing environment 1000 for distributing dictionaries. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented dictionary system, comprising:
   a format component for formatting a dictionary in a universal format consumable by disparate applications;
   a dictionary architecture to draw content for the formatted dictionary from other available dictionary sources on networks including: lexicons related to Asian languages, automobiles, printing, financials, construction, abbreviations, Japanese English, translation, old words, sources related to Chinese traditional (CHT) and Chinese simplified (CHS), and compound words, old poems, legal, economy, and medical;
   a compiler component for compiling the drawn formatted dictionary specific for use in each of the disparate applications in response to the dictionary being accessed; and
   a distribution component for sharing the compiled formatted dictionary with each of the compatible applications among the disparate applications supporting a format of the compiled formatted dictionary,
   wherein the disparate applications comprise speech dictation, spell checking, linguistic analysis, and input method applications.

2. The system of claim 1, wherein the dictionary is centrally located for access by the disparate applications.

3. The system of claim 1, wherein the universal format is XML.

4. The system of claim 1, further comprising an authoring tool for authoring the formatted dictionary to include at least one of text data, linguistic data, or dictation data.

5. The system of claim 1, wherein after the compiler component compiles the formatted dictionary for use by the linguistic analysis application the formatted and compiled dictionary is downloaded and registered with the application for use with the application.

6. The system of claim 1, wherein after the compiler component compiles the formatted dictionary for use by the spell checking application the formatted and compiled dictionary is downloaded and registered with the application for use with the application.

7. The system of claim 1, wherein after the compiler component compiles the formatted dictionary for use by the speech dictation system the formatted and compiled dictionary is downloaded and registered with the application for use with the application.

8. The system of claim 1, wherein the formatted and compiled dictionary is downloaded and registered with an application for use with the application, which is the input method application.

9. The system of claim 1, wherein the compiled formatted dictionary is shared via at least one of a website, an electronic message, or a file sharing application.

10. A computer-implemented dictionary system, comprising:
a format component for formatting a dictionary in a universal format consumable by disparate applications;
an authoring tool for authoring the formatted dictionary to include at least one of textual data, linguistic data, or dictation data;
a dictionary architecture to draw content for the formatted dictionary from other available dictionary sources on networks including: lexicons related to Asian languages, automobiles, printing, financials, construction, abbreviations, Japanese English, translation, old words, sources related to Chinese traditional (CHT) and Chinese simplified (CHS), and compound words, old poems, legal, economy, and medical;
a compiler component for compiling the drawn formatted dictionary specific for use in each of the disparate applications in response to a request for the dictionary and conducting checks related to at least one from a set of: geopolitics, accuracy, and performance to ensure the drawn formatted dictionary meets predefined criterion; and
a distribution component for synchronizing the compiled formatted dictionary with at least one other compiled formatted dictionary used by at least one application among the disparate applications,
wherein the disparate applications comprise speech dictation, spell checking, linguistic analysis, and input method applications and the compiler component compiles the formatted dictionary for use by the linguistic analysis application, the spell checking application, and the speech dictation system.

11. The system of claim 10, wherein the format component, authoring tool, and compiler component are centrally located for access by the disparate applications.

12. The system of claim 10, wherein the compiled formatted dictionary is downloaded for use by at least one of the linguistic analysis application, the spell checking application, or the speech dictation system.

13. The system of claim 10, wherein the formatted and compiled dictionary is downloaded and registered with a client application for use with the client application.

14. The system of claim 10, wherein the compiled formatted dictionary is distributed and shared via at least one of a website, an electronic message, or a file sharing application.

15. A computer-implemented dictionary method, comprising:
formatting a dictionary in a universal format consumable by disparate client applications;
drawing content for the formatted dictionary from other available dictionary sources on networks including: lexicons related to Asian languages, automobiles, printing, financials, construction, abbreviations, Japanese English, translation, old words, sources related to Chinese traditional (CHT) and Chinese simplified (CHS), and compound words, old poems, legal, economy, and medical;
compiling the drawn formatted dictionary specific for use in each of the disparate applications in response to a request for the dictionary;
conducting checks related to at least one from a set of: geopolitics, accuracy, and performance to ensure the dictionary meets predefined criterion;
downloading the compiled dictionary for use by the application;
sharing the compiled formatted dictionary with at least one compatible application among the disparate client applications supporting a format of the compiled formatted dictionary; and
synchronizing the compiled formatted dictionary with at least one other compiled formatted dictionary used by at least one other application among the disparate client applications,
wherein the disparate applications comprise speech dictation, spell checking, linguistic analysis, and input method applications.

16. The method of claim 15, further comprising registering the downloaded dictionary for use by the application.

17. The method of claim 15, further comprising adding an attribute to the dictionary related to a different application to the dictionary for use of the dictionary by the different application.

18. The method of claim 15, further comprising authoring the formatted dictionary to include at least one of text data, linguistic data, hand writing data, or dictation data.

19. The method of claim 15, further comprising updating the dictionary centrally for distributed use in an XML format by compatible applications.

20. The method of claim 15, further comprising downloading the compiled dictionary for use by at least one of the linguistic analysis application, the spell checking application, or the speech dictation system.

* * * * *